Patented Sept. 18, 1951

2,568,571

UNITED STATES PATENT OFFICE 2,568,571

HALOACETYLAMIDOPHENYL-HALO-ACETAMIDOPROPANDIOL

Marie-Jo Sullivan, Detroit, Mich., assignor to Parke, Davis & Company, Detroit, Mich., a corporation of Michigan No Drawing. Application September 23, 1950,
Serial No. 186,496

5 Claims. (Cl. 260—562)

This invention relates to haloacetamido diols and to methods for obtaining the same. More particularly, the invention relates to haloacetamido diols having the formula,

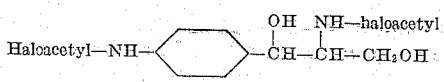

It will be apparent to those skilled in the art that the products of the invention and the starting materials used in their production can exist in structural or diastereoisomeric as well as optical isomeric forms. The present invention is concerned with products having the pseudo diastereoisomeric form. The term "pseudo" as used herein is synonymous with the designation "threo" which is also used by chemists when referring to the particular diastereoisomeric form under consideration. The pseudo diastereoisomers (hereinafter abbreviated to $\psi$-form) are those compounds wherein the two most highly polar of the groups on the asymmetric carbon atoms lie on opposite sides of the plane of the two carbon atoms.

Due to the difficulty of representing the optical and diastereoisomeric forms in graphic formulae the customary structural formulae will be used in both the specification and claims and a notation placed below the formula to designate the structural and optical configuration of the compound. Where no optical designation is used it is to be understood that the formula is to be interpreted in its generic sense, that is, as including the individual (l) and (d) optical isomers as well as the racemic mixture.

In accordance with the invention haloacetamido diols of formula,

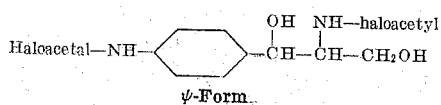
$\psi$-Form are produced by the direct or stepwise haloacetylation of an amino diol of formula,

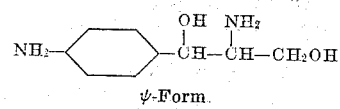
$\psi$-Form

The direct haloacetylation of the amino diol compound, that is, the introduction of two identical haloacetyl groups at the same time, is carried out by reacting the amino diol with a haloacetic anhydride at a low temperature. The reaction can be carried out under anhydrous or aqueous conditions. If carried out under anhydrous conditions the temperature should be kept below about 60° C. and large excesses of the acylating agent should be avoided. In general, the reaction mixture only needs to be heated for about ten minutes at 40–50° C. in order to bring about the reaction. When the reaction is carried out under aqueous conditions it is preferable to employ an alkaline catalyst such as an alkali metal salt of an organic acid or an alkali or alkaline earth metal bicarbonate or carbonate.

Where different haloacetyl groups are desired on the two nitrogen atoms the haloacetylation is carried out in a stepwise fashion. This method can also be used where the haloacetyl groups are the same but it is usually more expedient to use the direct haloacetylation method described above.

In carrying out the stepwise haloacetylation it is possible to haloacetylate either the aliphatic or aromatic amino group first. It is preferable to first haloacetylate the aromatic amino group because of the relative instability of the $\psi$-1-p-aminophenyl-2-haloacetamidopropane-1,3-diols. In selectively haloacetylating the aromatic amino group the $\psi$-1-p-aminophenyl-2-aminopropane-1,3-diol is reacted with a haloacetic anhydride or halide under aqueous conditions in the presence of at least one equivalent of a mineral acid such as hydrochloric, hydrobromic, sulfuric and the like acids. The product thus obtained is a mineral acid salt of the $\psi$-1-p-haloacetamidophenyl-2-aminopropane-1,3-diol. To convert this product to the desired $\psi$-1-p-haloacetamidophenyl-2-haloacetamidopropane-1,3-diol, the salt is neutralized and the free base compound reacted with a lower alkyl ester of a haloacetic acid under anhydrous conditions. In general, it is most convenient to carry out both the neutralization and haloacetylation steps simultaneously by dissolving the mineral acid salt of the $\psi$-1-haloacetamidophenyl-2-aminopropane-1,3-diol in an anhydrous organic solvent such as methanol, ethanol, isopropanol and the like, containing at least one equivalent of an alkali metal alkoxide and then treating the mixture with a lower alkyl ester of a haloacetic acid. The temperature during the first haloacetylation step is preferably kept below about 35° C. while in the last haloacetylation step a temperature up to about 100° C. can be used. However, in the last haloacetylation step best results are obtained when the temperature of the reaction mixture is not allowed to rise above about 35° C. Instead of using an alkyl ester of a haloacetic acid as the acylating agent in the last haloacetylation, one can employ a haloacetyl halide or haloacetic anhydride. In this instance the reaction is preferably carried out under anhydrous conditions at a relatively low temperature. If desired, the anhydride can also be used under aqueous conditions, preferably in the presence of a basic catalyst.

In order to first haloacetylate the aliphatic amino group and then the aromatic amino group, the $\psi$-1-p-amino-phenyl-2-aminopropane-1,3- diol is first reacted with a lower alkyl ester of a haloacetic acid under anhydrous conditions. The temperature during the reaction should not be above 100° C. A solvent is not necessary but, if desired, one may be used. Some suitable solvents are methanol, ethanol, isopropanol, ethyl acetate and the like. The second step, the halocetylation of the ψ-1-p-aminophenyl-2-haloacetamidopropane-1,3-diol, is carried out by reacting the aforementioned compound with a haloacetic anhydride under the same conditions as used for the direct haloacetylation of both of the amino groups.

The products of the invention are valuable antibiotics. They are tasteless and may be administered by the oral route. Their tasteless nature is of particular importance when orally administering the products to children or patients who are unable to swallow capsules.

The invention is illustrated by the following examples.

*Example 1*

(a) 173 g. dichloroacetic anhydride is added slowly to 33.3 g. of (1)-ψ-1-p-aminophenyl-2-aminopropane-1,3-diol suspended in 750 cc. of ethyl acetate. The temperature rises to about 50° C. and the mixture is allowed to remain at this temperature of about ten minutes. The solvent is removed by distillation in vacuo and the residue washed with petroleum ether. The insoluble material is dissolved in one liter of 50% aqueous acetone and the solution adjusted to pH 7 with sodium hydroxide solution. The solution is allowed to stand overnight at 10° C. and then evaporated to dryness in vacuo. The residue is washed with 200 cc. of water and then with petroleum ether. The crude (1)-ψ-1-p-dichloroacetamidophenyl-2-dichloroacetamidopropane-1,3-diol so obtained can be purified, if desired, by recrystallization from 50% ethanol; M. P. 174–5° C.; $[\alpha]_D^{28} = +10.92°$ in absolute alcohol. The formula of this product is:

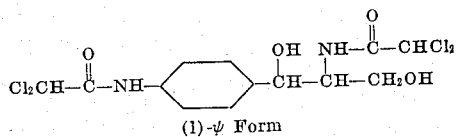

(1)-ψ Form (b) 8 g. of (1)-ψ-1-p-aminophenyl-2-aminopropane-1,3-diol and 7 g. of methyl dichloroacetate are dissolved in absolute methanol and the solution refluxed for fifteen minutes. The solvent is removed by distillation in vacuo, the residue is dissolved in 50 cc. of absolute ethanol and acidified with alcoholic hydrogen chloride. The hydrochloride salt of (1)-ψ-1-p-aminophenyl-2-dichloroacetamidopropane-1,3-diol which separates is collected, washed with anhydrous ether and dried immediately in vacuo. The product is quite unstable and melts at about 100° C. with decomposition. Its formula is:

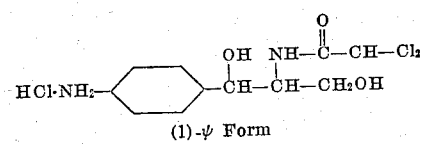

(1)-ψ Form (c) 5.27 g. of dichloroacetic anhydride is added slowly at 15° C. to a solution composed of 3.66 g. of (l)-ψ-1-p-aminophenyl-2-aminopropane-1,3-diol, 25 cc. of water and 10 cc. of 2 N hydrochloric acid and the resulting mixture allowed to stand at room temperature for fifteen minutes. The reaction mixture is extracted with ether, the ether extracts discarded and the aqueous phase evaporated to dryness in vacuo. The residual viscous oil is taken up in absolute ethanol and the solution acidified with alcoholic hydrogen chloride. Isopropanol is added to the mixture and the ethanol removed by distillation. The residue is cooled and the crystalline hydrochloride salt of (1)-ψ-1-p-dichloroacetamidophenyl-2-aminopropane-1,3-diol collected. This compound which has the formula,

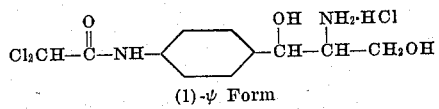

(1)-ψ Form can be purified by recrystallization from absolute ethanol isopropanol mixture.

0.746 g. of (1)-ψ-1-p-dichloroacetamidophenyl-2-aminopropane-1,3-diol hydrochloride dissolved in 25 cc. of absolute ethanol is added to a solution of 0.053 g. of sodium in 25 cc. of absolute ethanol and the resulting precipitate of sodium chloride removed by filtration. 0.372 g. of methyl dichloroacetate is added to the filtrate and the reaction mixture allowed to stand at room temperature for forty-eight hours. The solvent is removed by distillation in vacuo and the residue triturated with petroleum ether. The crude (1)-ψ-1-p-dichloroacetamidophenyl-2-dichloroacetamidopropane-1,3-diol is collected and purified by recrystallization from aqueous ethanol; M. P. 174–5° C.

*Example 2*

0.746 g. of (1)-ψ-1-p-dichloroacetamidophenyl-2-aminopropane-1,3-diol hydrochloride [prepared as described in Example 1(c)] dissolved in 25 cc. of absolute ethanol is added to a solution of 0.053 g. of sodium dissolved in 25 cc. of absolute ethanol. The sodium chloride which precipitates is removed by filtration and 0.6 g. of methyl dibromoacetate added to the filtrate. The reaction mixture is heated on a steam bath for forty-five minutes and then the solvent removed by distillation in vacuo. The residue is washed with petroleum ether and the insoluble material which consists of (1)-ψ-1-p-dichloroacetamidophenyl-2-dibromoacetamidopropane-1,3-diol collected. The product which has the formula,

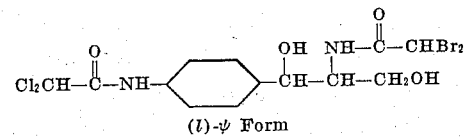

(l)-ψ Form is a white crystalline solid. It can be purified by recrystallization from 50% ethanol.

*Example 3*

7.65 g. of difluoroacetic anhydride is added slowly with stirring at 10° C. to a solution composed of 7.32 g. of (1)-ψ-1-p-aminophenyl-2-aminopropane-1,3-diol, 50 cc. of water and 20 cc. of 2 N hydrochloric acid. The mixture is allowed to stand at room temperature for fifteen minutes, extracted with ether and the ether extracts discarded. The aqueous solution is evaporated to dryness in vacuo and the residue taken up in anhydrous isopropanol. A small amount of the isopropanol is removed by distillation and the residue acidified with hydrogen chloride dissolved in anhydrous isopropanol. The (1)-ψ-1- p-difluoroacetamidophenyl-2-aminopropane-1,3-diol hydrochloride which separates is collected and purified by recrystallization from an anhydrous mixture of isopropanol and ethanol. The formula of this product is,

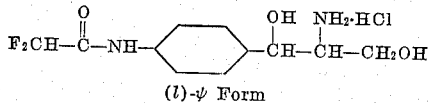

(l)-ψ Form 1.4 g. of (l)-ψ-1-p-difluoroacetamidophenyl-2-aminopropane-1,3-diol hydrochloride in 25 cc. of absolute ethanol is added to 0.11 g. of sodium dissolved in 25 cc. of absolute ethanol. The sodium chloride is removed by filtration and the ethanol evaporated rapidly from the solution under reduced pressure. The residue is taken up in 20 cc. of ethyl acetate and the mixture chilled to 0° C. 0.5 cc. of iodoacetyl chloride is added in small portions with stirring over a period of ten minutes. The reaction mixture is allowed to stand for one-half hour and then evaporated to dryness in vacuo. The residue is washed with 0.1 N sulfuric acid and the insoluble (l) - ψ-1-p-difluoroacetamidophenyl-2-iodoacetamidopropane-1,3-diol purified by several recrystallizations from aqeous ethanol. Its formula is:

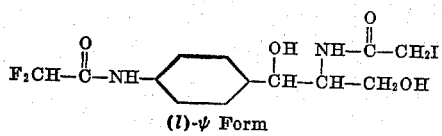

(l)-ψ Form

Example 4

86 g. of dichloroacetic anhydride is added slowly with stirring to 16.7 g. of (dl)-ψ-1-p-aminophenyl-2-aminopropane-1,3-diol in 400 cc. of ethyl acetate. The temperature of the reaction mixture is allowed to rise to about 40° C. and it is kept at this temperature for about ten minutes. The solvent is removed by distillation in vacuo and the residue washed with petroleum ether. The insoluble material is collected, dissolved in 500 cc. of 50% aqueous acetone and the pH of the solution adjusted to 7 with sodium hydroxide solution. The solution is allowed to stand overnight at 10° C. and then evaporated to dryness in vacuo. The residue is washed with water, then with petroleum ether and dried. The crude (dl)-ψ-1-p-dichloroacetamidophenyl-2-dichloroacetamidopropane-1,3-diol so obtained is purified by recrystallization from aqueous ethanol. Its formula is:

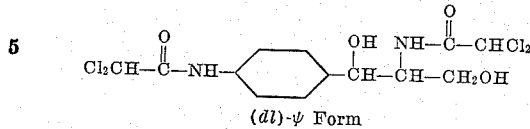

(dl)-ψ Form

The ψ-1-p-aminophenyl-2-aminopropane-1,3-diols used as starting materials in the practice of the invention can be prepared by reduction of the corresponding ψ-1-p-nitrophenyl-2-aminopropane-1,3-diols. For example, (l)-ψ-1-p-aminophenyl-2-aminopropane-1,3-diol, which is used as the starting material in Examples 1 and 3, can be prepared as follows:

A mixture consisting of 25 g. of (l)-ψ-1-p-nitrophenyl-2-aminopropane-1,3-diol, 2.3 g. of palladium on charcoal hydrogenation catalyst and 500 c. of absolute methanol is placed in a hydrogenation bottle and shaken with hydrogen gas at 50 lbs. per sq. in. pressure. The reaction is highly exothermic and 0.36 mole of hydrogen are absorbed within one-half hour. The mixture is cooled, the catalyst removed by filtration and the filtrate evaporated to dryness in vacuo. The residue consists of (l)-ψ-1-p-aminophenyl-2-aminopropane-1,3-diol which can be purified by recrystallization from 50% ethanol; M. P. 134-6° C.

What I claim is:

1. A compound of the formula,

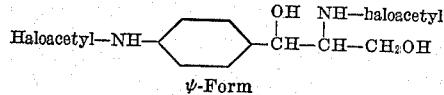

ψ-Form

2. A compound of the formula,

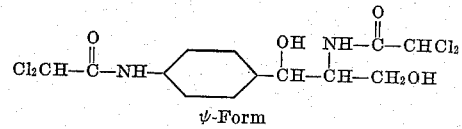

ψ-Form 3. (l) - ψ - 1-p-dichloroacetamidophenyl-2-dichloroacetamidopropane-1,3-diol.

4. (dl) - ψ-1-p-dichloroacetamidophenyl-2-dichloroacetamidopropane-1,3-diol.

5. (l) - ψ-1-p-dichloroacetamidophenyl-2-dibromoacetamidopropane-1,3-diol.

MARIE-JO SULLIVAN.

No references cited.